(12) United States Patent
Oettinger

(10) Patent No.: US 9,087,638 B2
(45) Date of Patent: Jul. 21, 2015

(54) WIRELESS POWER SYSTEM AND METHOD

(75) Inventor: Eric Gregory Oettinger, Rochester, MN (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 836 days.

(21) Appl. No.: 13/324,540

(22) Filed: Dec. 13, 2011

(65) Prior Publication Data

US 2013/0147280 A1 Jun. 13, 2013

(51) Int. Cl.
| | |
|---|---|
| *H01F 27/42* | (2006.01) |
| *H01F 37/00* | (2006.01) |
| *H01F 38/00* | (2006.01) |
| *H01F 38/14* | (2006.01) |
| *H02J 17/00* | (2006.01) |
| *H02J 5/00* | (2006.01) |
| *H02J 7/02* | (2006.01) |

(52) U.S. Cl.
CPC ............... *H01F 38/14* (2013.01); *H02J 5/005* (2013.01); *H02J 7/025* (2013.01); *H02J 17/00* (2013.01)

(58) Field of Classification Search
CPC ........... H02J 17/00; H02J 5/005; H02J 7/025; H01F 38/14
USPC ........................................................ 307/104
See application file for complete search history.

(56) References Cited

U.S. PATENT DOCUMENTS

| | | | |
|---|---|---|---|
| 2003/0151930 A1 | 8/2003 | Berghegger | |
| 2009/0096413 A1* | 4/2009 | Partovi et al. | 320/108 |
| 2009/0174263 A1* | 7/2009 | Baarman et al. | 307/104 |
| 2011/0193416 A1 | 8/2011 | Campanella et al. | |

FOREIGN PATENT DOCUMENTS

| | | |
|---|---|---|
| KR | 1020100110356 | 10/2010 |
| KR | 1020110034664 | 4/2011 |
| KR | 1020110074795 | 7/2011 |

OTHER PUBLICATIONS

PCT Search Report mailed Mar. 28, 2013.

* cited by examiner

*Primary Examiner* — Carlos Amaya
(74) *Attorney, Agent, or Firm* — William B. Kempler; Frank D. Cimino

(57) ABSTRACT

A wireless power system and method are provided that employ a hybrid approach to adjusting transmission power to take advantages of the best features of frequency mode adjusting and duty cycle mode adjusting. The wireless system and method attempt to modify duty cycle as a first adjustment, unless the duty cycle adjustment causes the duty cycle to be outside a predefined range. If the duty cycle adjustment causes the duty cycle to be outside a predefined range, the wireless system and method employ frequency mode adjusting to adjust transmission power.

12 Claims, 2 Drawing Sheets

WIRELESS POWER SYSTEM AND METHOD

TECHNICAL FIELD

The present invention relates generally to electronics, and specifically to a wireless power system and method.

BACKGROUND

There is currently a need for powering portable or mobile devices for use in commercial, business, personal, consumer, and other applications. Examples of such devices include cellular telephones, personal digital assistants (PDAs), notebook computers, mobile email devices, music players, radios, compact disk players, video game consoles, digital cameras, electric shavers, electric toothbrushes and even electric cars. Most of these devices include a rechargeable internal battery that needs to be charged by an external power supply or charger, before the device itself can be used. Recently, there has been an interest in providing a universal wireless method for powering or charging one or several mobile devices, batteries, and/or electronics devices. These "wireless power" methods can be generally divided into conductive and inductive methods. The conductive methods use flow of current from a charger and/or power supply into the mobile devices to provide power and receive power through matching contacts on the back of a device and the pad without 'plugging in' the device. The inductive methods utilize coils or wires in a charger and/or power supply to create a magnetic field in the vicinity of the surface. A coil or wire in a receiver embedded into or on a device or battery that is in the vicinity of the surface can sense the magnetic field. Power from the charger and/or power supply can be transferred to the receiver without any wired connection through air or other media in between.

Recently, an organization has been started known as the "Wireless Power Consortium" (WPC) which is a business alliance formed to create a universal wireless power charging standard specification for inductive charging. In a wireless power system conforming to the WPC standard specification, the receiver being charged, communicates a "Control Error" signal to a transmitter that is providing charging power to the receiver. The "Control Error" signal provides an indication of a difference between the power being received and the power that the receiver desires. The transmitter generates a proportional integral derivate (PID) response to the error signal and updates the PWM output to provide the desired power to the receiver. Updating of the output has been accomplished in one of two manners traditionally through either frequency modulation or duty cycle modulation. Frequency modulation is applicable in a resonant system in which the power can be controlled by adjusting the frequency of the drive signal. The further that the frequency is from the resonant peak, the lower the delivered power. Duty cycle modulation operates at a fixed frequency (typically near resonance) and controls the output by varying the on-time/off-time ratio.

Both frequency mode control and duty cycle mode control have their own drawbacks and strengths. A drawback for frequency mode control is that the resolution of the frequency output may be limited. The frequency may be set by adjusting the number of system clock cycles in each period. As the operating frequency increases, the resolution of the adjustment decreases. The coarseness of the adjustment may not be accurate enough to meet the system requirements. Secondly, in a consortium defined specification, the supply voltage may be constrained to meet the requirement for the resultant delivered power. This limits the selection of drivers and driver topologies. Other factors besides a specification can also limit operating frequency.

Duty cycle control can have an advantage of higher output resolution compared to frequency mode control. However, with many systems, there is a lower limit at which the duty cycle can be set before the system changes modes of operation or ceases to work completely, such as the transition between continuous and discontinuous modes of operation. To maximize possible output range the duty cycle system is typically run close to resonance, which may result in substantial power for even low duty cycles. Combined with the lower limit to duty cycle, this can easily make the system unable to deliver low power loads. Another issue is that the resonance of the transmitter can shift due to manufacturing tolerances, or environmental changes. If the operating point gets too far from the resonant frequency, high power levels may become unattainable.

SUMMARY

In accordance with an aspect of the present invention, a wireless power system is provided. The wireless power system comprises a transmitting circuit that includes an inductor configured to generate a magnetic field to provide power to a receiver, and a drive controller that provides a switching control signal to drive the transmitting circuit. The drive controller is configured to adjust frequency and/or duty cycle of the switching control signal to adjust the power generated and provided to the receiver by the transmitting circuit through the inductor to a desired power in response to a control signal from the receiver. The drive controller adjusts the duty cycle to achieve the desired power unless the adjustment of the duty cycle causes the duty cycle to be outside of a predefined duty cycle range. The drive controller adjusts the frequency to achieve the desired power if the adjustment of the duty cycle causes the duty cycle to be outside of the predefined duty cycle range.

In accordance with another aspect of the present invention, a wireless power system is provide that comprises a receiver, a load coupled to the receiver, such that the power to the receiver is provided to power the load and/or charge a battery associated with the load, and a transmitter. The transmitter comprises a transmitting circuit that includes an inductor configured to generate a magnetic field to provide power to the receiver, and a drive controller that provides a switching control signal to drive the transmitting circuit. The drive controller is configured to adjust frequency and/or duty cycle of the switching control signal to adjust the power generated and provided to the receiver by the transmitting circuit through the inductor to a desired power in response to a control error signal from the receiver that provides an indication between the desired power and actual power received by the load. The drive controller adjusts the duty cycle to achieve the desired power unless the adjustment of the duty cycle causes the duty cycle to be outside of a predefined duty cycle range. The drive controller sets the duty cycle to a preset duty cycle and adjusts the frequency to achieve the desired power if the adjustment of the duty cycle causes the duty cycle to be outside of the predefined duty cycle range.

In accordance with another aspect of the invention, a method for providing wireless power is provided. The method comprises setting an initial frequency and duty cycle of a switching control signal that drives a transmitting circuit that includes an inductor configured to generate a magnetic field to provide power to a receiver, receiving a control error signal from the receiver that provides an indication between a desired power and actual power received, and adjusting the duty cycle of the switching control signal to achieve the desired power unless the adjustment of the duty cycle causes the duty cycle to be outside of a predefined duty cycle range. The method further comprises adjusting the frequency of the switching control signal to achieve the desired power if the adjustment of the duty cycle causes the duty cycle to be outside of the predefined duty cycle range.

DETAILED DESCRIPTION

A wireless power system and method are provided that employ a hybrid approach to adjusting transmission power of a transmitting circuit to take advantages of the best features of frequency mode adjusting and duty cycle mode adjusting. The transmitting circuit can include one or more switches (e.g., field-effect transistors (FETs) driven by a switching control signal to control power to an inductor-capacitor (LC) resonant tank circuit in which the inductor is configured to generate a magnetic field which can provide power to a receiver. The wireless system and method attempt to modify duty cycle of the switching control signal as a first adjustment, unless the duty cycle adjustment causes the duty cycle to be outside a predefined range. If a receiver is requesting more power and the adjusted duty cycle would fall above a predetermined maximum ($D_{MAX}$), the duty cycle is set to a duty cycle high preset setting ($D_{HPS}$) that may be at or below the predetermined maximum and the frequency is reduced to achieve the desired power requested by the receiver. Setting the $D_{HPS}$ below the predetermined maximum allows for headroom for further upward adjustments of the duty cycle. If a receiver is requesting less power and the duty cycle adjustment is below a predetermined minimum ($D_{MIN}$), the duty cycle is set to a duty cycle low preset setting ($D_{LPS}$) that is at or above the predetermined minimum and the frequency is increased to achieve the desired power requested by the receiver. Setting the $D_{LPS}$ below the predetermined minimum allows for headroom for further downward adjustments of the duty cycle.

Figure 1:
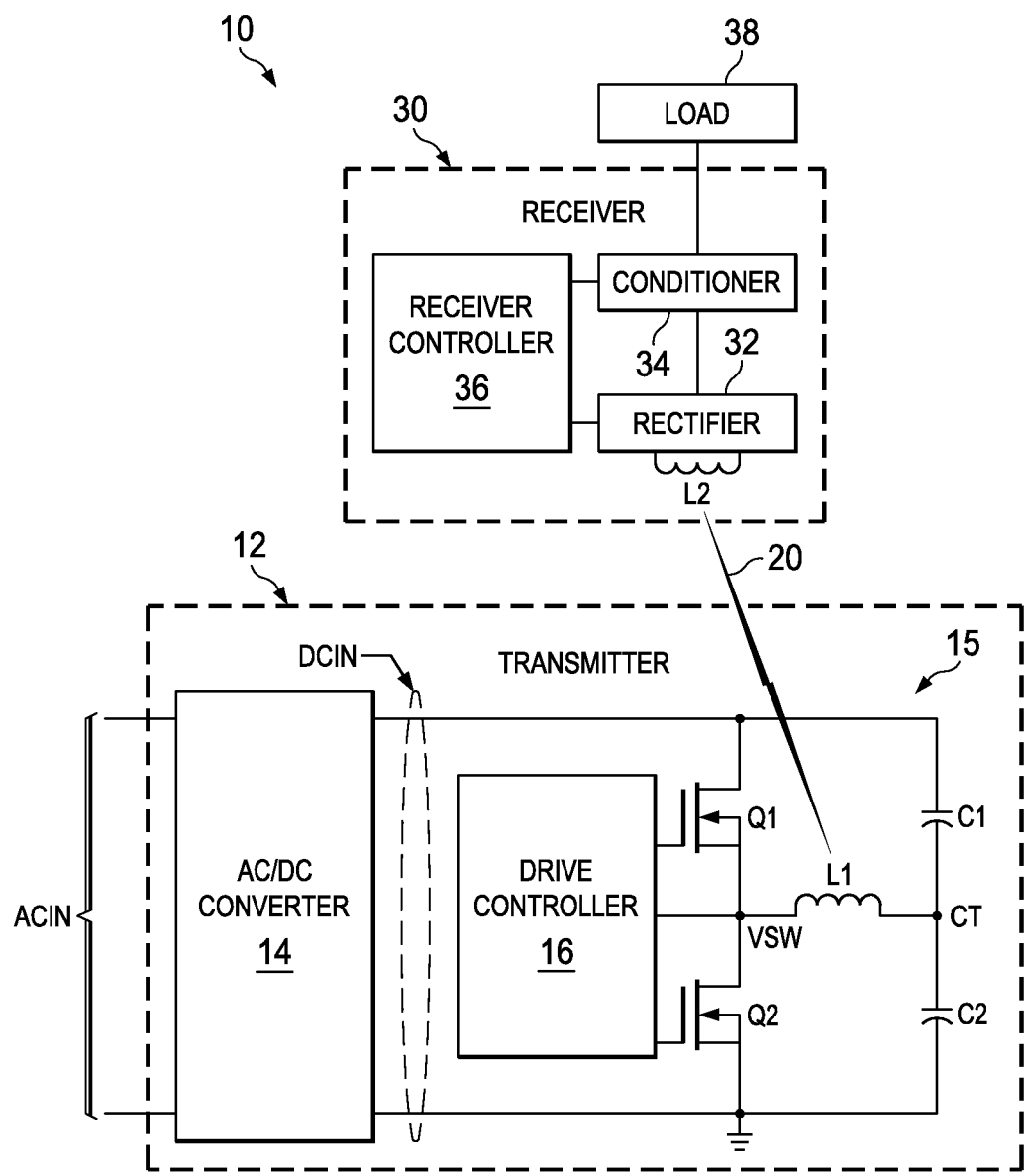
FIG. 1 illustrates a schematic block diagram of a wireless power system in accordance with an aspect of the present invention.

FIG. 1 illustrates a wireless power system 10 in accordance with an aspect of the present invention. The wireless power system 10 includes a transmitter 12 configured to provide wireless power to a receiver 30 over a wireless communication link 20. The receiver 30 is configured to receive the wireless power and provide the wireless power to a load 38 (e.g., a mobile battery chargeable device). The power to the load 38 can be employed for powering of the load and/or for providing charging of a rechargeable batty associated with the load 38. The receiver 30 is also configured to transmit communication signals that may include a control error signal that indicates a difference between a desired received power to the load and an actual received power to the load. The transmitter 12 can then modify the duty cycle and/or frequency of a switching control signal to a transmitting circuit 15 (e.g., half-bridge or full bridge inverter circuit) to adjust the power transmitted to the receiver 12 to achieve the desired received power to the load 38.

The transmitter 12 includes an AC/DC converter 14 that receives AC input power (ACIN) and generates DC input power (DCIN) to be employed to drive the transmitting circuit 15. The transmitting circuit 15 includes a drive controller 14 that controls the operation of a high-side field-effect transistor (FET) Q1 and a low-side FET Q2. The high-side FET Q1 and the low-side FET Q2 are demonstrated in the example of FIG. 1 as N-type FETs. However, other types of transistors could be used in accordance with an aspect of the invention. Furthermore, the transmitting circuit 15 is illustrated as a, half-bridge inverter, but a full bridge inverter could also be employed in accordance with an aspect of the present invention. The high-side FET Q1 is interconnected between the DC input voltage (DCIN) at a drain terminal and a switching node VSW at a source terminal. The low-side FET Q2 is interconnected between the switching node VSW at a drain terminal and a negative voltage rail at a source terminal, the negative voltage rail being demonstrated as ground in the example of FIG. 1. The drive controller 16 thus controls the voltage potential at the switching node VSW by alternately switching between opposing "ON" and "OFF" states of the high-side FET Q1 and the low-side FET Q2. It is to be understood that the opposing switching of the high-side FET Q1 and of the low side FET Q2 is such that only one of the high-side FET Q1 and the low side FET Q2 may be activated at a given time to avoid a short circuit between the DC input voltage (DCIN) and ground.

The transmitting circuit 15 also includes an output inductor L1 coupled to the switching node VSW at a first end and coupled to a coupling terminal (CT) of two series coupled capacitors C1 and C2. The series coupled capacitors C1 and C2 are coupled between the DC input voltage (DCIN) and ground. The output inductor L1 generates a magnetic field in response to current conducted through the output inductor L1. The magnetic field is transmitted to an inductor L2 of the receiver when the receiver 30 and transmitter 12 are placed in proximity to one another to provide the receiver 30 with wireless power. The receiver 30 includes a rectifier 32 coupled to the inductor L2. The rectifier 32 rectifies the signal generated through the inductor L2 in response to the magnetic field generated by the inductor L1 and received by the inductor L2. The rectified signal is provided to a load conditioner 34 that conditions the signal prior to providing the signal to the load 38. A receiver controller 36 controls and communicates with the rectifier 32 and load conditioner 34. The receiver controller 36 can transmit communication signals over the inductor L2 to the inductor L1 that is received by the controller 16, which may include a control error signal that is an indication of a difference in desired and actual power received by the load 38.

The drive controller 16 receives the control error signal and generates a proportional integral derivate (PID) response to the control error signal. The PID response is employed by the drive controller 16 to adjust a switching control signal (PWM output) to the transmitting circuit 15 to provide the desired power to the receiver 30. The switching control signal alternates between switching opposing "ON" and "OFF" states of the high-side FET Q1 and the low-side FET Q2. The drive controller 16 first attempts to modify the duty cycle of the switching control signal as a first adjustment, unless the duty cycle adjustment causes the duty cycle to be outside a predefined range. As stated above, if the receiver is requesting more power and the duty cycle adjustment causes the duty cycle to be above a predetermined maximum ($D_{MAX}$), the duty cycle is set to a duty cycle high preset setting ($D_{HPS}$) that is at or below the predetermined maximum and the frequency is reduced to achieve the desired power requested by the receiver. If a receiver is requesting less power and the duty cycle adjustment causes the duty cycle to be below a predetermined minimum ($D_{MIN}$), the duty cycle is set to a duty cycle low preset setting ($D_{LPS}$) that is at or above the predetermined minimum and the frequency is increased to achieve the desired power requested by the receiver.

The example of FIG. 1 illustrates a single transmitter and output inductor L1, while it should be appreciated that multiple output inductors could be arranged on a pad driven by one or more transmitter devices. It is further appreciated that the output inductor L1 and capacitors C1 and C2 form a resonant tank circuit such that more power can be delivered when operating at frequencies at or near the resonance of the resonant tank circuit.

A description of the controller operation is easiest conveyed through the following example that conforms to the WPC specification. For the wireless power transmitter confirming to the WPC specification, the operating frequency can be set to a range of 110 kHz to 205 kHz. The half-bridge topology can limit the duty cycle to 50% on the high side, and the magnetics involved in the power transfer can prevent operation below 20% from working reliably. As an initial operating point, the switching control signal frequency can be selected to be 175 kHz (spec) with a 50% duty cycle. When the power receiver requests a change in power, the adjustment is made by duty cycle control alone if possible. If the required change in duty cycle would push the operating point outside of the [20-50]% range however, the adjustment is made to both the frequency and the duty cycle. The duty cycle is set to a preset point within its range and the frequency adjustment is made to compensate both the requested power change and the adjustment of the duty cycle to the preset point. Using a preset point for the duty cycle instead of using a maximum or minimum duty cycle and using frequency control to finish the adjustment leaves the system in a position to use just duty cycle control for subsequent control adjustments. While the ideal preset value might be the midpoint of its operating range (35% in this example), it may be difficult to estimate the appropriate frequency change to compensate for that large of a duty cycle adjustment.

Figure 2:
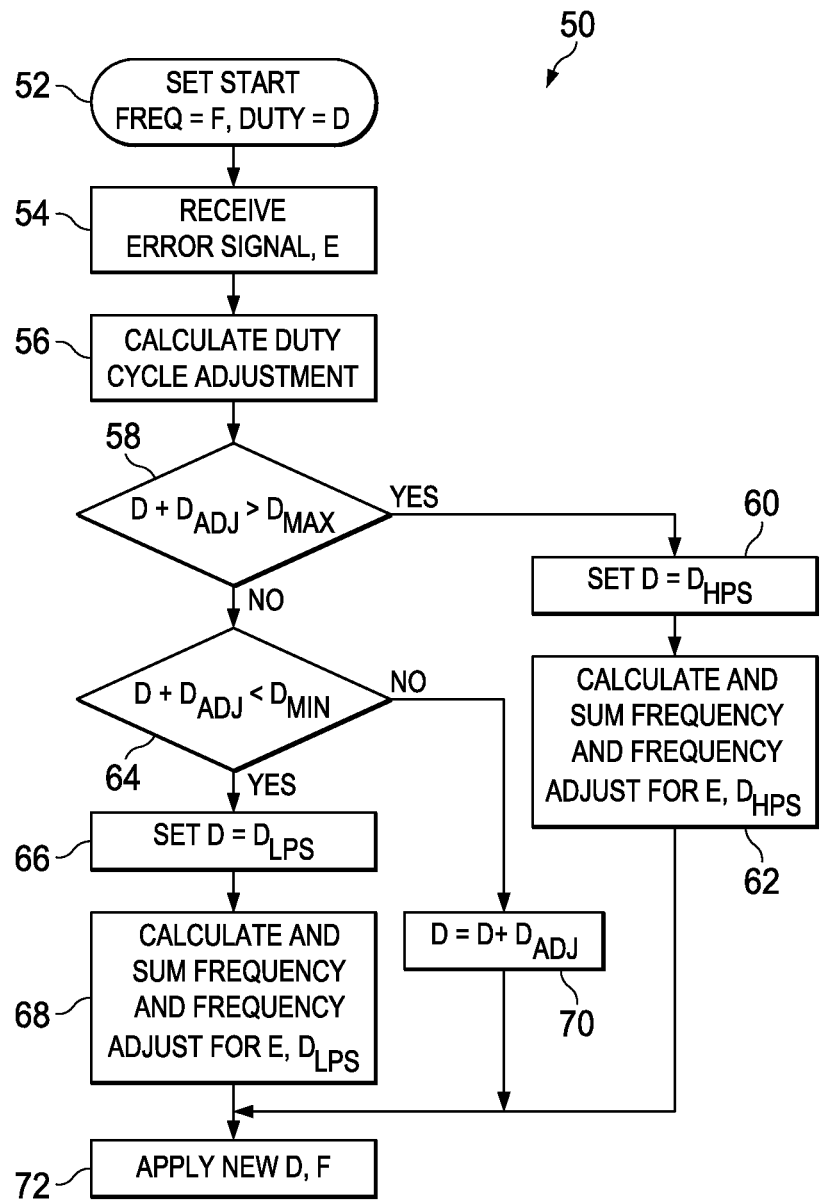
FIG. 2 illustrates a method for providing wireless power in accordance with an aspect of the invention.

In view of the foregoing structural and functional features described above, certain methods will be better appreciated with reference to FIG. 2. It is to be understood and appreciated that the illustrated actions, in other embodiments, may occur in different orders and/or concurrently with other actions. Moreover, not all illustrated features may be required to implement a method.

FIG. 2 illustrates a method 50 for providing wireless power in accordance with an aspect of the present invention. The method 50 begins at 52, where a start frequency (FREQ=F) and a start duty cycle (DUTY=D) of the switching control signal of the wireless transmitter are set to provide a given transmission power. At 54, a control error signal (E) from the receiver is received by the transmitter that indicates a difference between a desired received power and an actual received power to a load coupled to the receiver. At 56, a duty cycle adjustment is calculated based on the control error signal. The methodology then proceeds to 58. At 58, a determination is made on whether the current duty cycle (D) plus the duty cycle adjustment ($D_{ADJ}$) is greater than a predetermined maximum duty cycle ($D_{MAX}$) (i.e., $D+D_{ADJ}>D_{MAX}$). If the current duty cycle (D) plus the duty cycle adjustment ($D_{ADJ}$) is greater than the predetermined maximum duty cycle ($D_{MAX}$) (YES), the duty cycle is set to a duty cycle high preset setting ($D=D_{HPS}$) that is at or below the predetermined maximum duty cycle ($D_{MAX}$) and the frequency is reduced at 62 to achieve the desired power requested by the receiver. At 62, the frequency adjustment is calculated and summed for the control error signal (E) and the adjustment in duty cycle from the current duty cycle to the duty cycle high preset setting ($D_{HPS}$). The methodology then proceeds to 72 to apply the new duty cycle and new frequency (NEW D, F).

If the current duty cycle (D) plus the duty cycle adjustment ($D_{ADJ}$) is not greater than a predetermined maximum duty cycle ($D_{MAX}$) (NO), the methodology proceeds to 64. At 64, a determination is made on whether the current duty cycle (D) plus the duty cycle adjustment ($D_{ADJ}$) is less than a predetermined minimum duty cycle ($D_{MIN}$) (i.e., $D+D_{ADJ}<D_{MIN}$). If the current duty cycle (D) plus the duty cycle adjustment ($D_{ADJ}$) is less than the predetermined minimum duty cycle ($D_{MIN}$) (YES), the duty cycle (D) is set to a duty cycle low preset setting ($D_{LPS}$) that is at or above the predetermined minimum duty cycle ($D_{MIN}$) and the frequency is increased at 68 to achieve the desired power requested by the receiver. At 68, the frequency adjustment is calculated and summed for the control error signal (E) and the adjustment in duty cycle from the current duty cycle (D) to the duty cycle low preset setting ($D_{LPS}$). The methodology the proceeds to 72 to apply the new duty cycle and new frequency (NEW D, F).

The following describes a specific example of the drive controller operation of FIG. 1 and the methodology of FIG. 2 for providing wireless power. The example confirms to the WPC specification. The example assumes that the transmitter is operating at an initial switching control signal frequency of 158 kHz, with a 49% duty cycle. The example assumes that the transmitter has received a Control_Error=15 from the receiver. Employing control error constants of Kp=10.0, Ki=0.25, such that $$PID\_out = Kp * Control\_Error + Ki * Control\_Error \quad \text{EQ. 1}$$
$$= 10 * 15 + 0.25 * 15$$
$$= 153.75$$

Based on the WPC specification, the scalings from PID_out to a duty cycle or frequency adjustment are as follows:

$$duty\_Sv = -0.01$$
$$freq\_Sv = 1.5 \quad 110-140 \text{ (kHz)}$$
$$2.0 \quad 140-160 \text{ (kHz)}$$
$$3.0 \quad 160-180 \text{ (kHz)}$$
$$5.0 \quad 180-205 \text{ (kHz)}$$

The duty cycle control adjustment can be calculated as follows:

$$Duty\_adjusted = PID\_out * duty\_Sv = 153.75 * 0.01 = 1.53 \quad \text{EQ. 2}$$

This is a request for a 1.53% duty cycle increase (which is greater than the maximum predetermined duty cycle of 50%). So since the adjustment would make the duty cycle greater than the maximum duty cycle, a frequency control adjustment is determined to increase the transmission power as follows:

$$Freq\_adjust = PID\_out * freq\_Sv = 153.75 * 2.0 = 307.5 \quad \text{EQ. 3}$$

Therefore, Control_Error=15 is requesting a change of 307.5 Hz in frequency. In addition to the adjustment for Control_Error, the duty cycle is adjusted toward the center of its range to allow for duty cycle headroom. In this example, the preset point is selected to be 5% in from the limit, or 45%. From our present operating point of 49% this is a 4% additional adjustment. The relationship between scaling factors is determined based on the commonality of PID_out such that:

$$4\%/\text{duty\_}Sv * \text{freq\_}Sv = 4/0.01*2 = 800 \text{ Hz}. \quad \text{EQ. 4}$$

So the total frequency adjustment would be 307.5+800=1107.5 Hz and the new operating point would be 156.8925 kHz and 45% duty cycle. Leaving us at a point where the Error should have been compensated, and with available space for future duty cycle adjustments.

In the preceding example a table was used to set the gain between PID_output and frequency. This piecewise linear table is practical and easy to implement however it is a coarse estimate of the resonant curve. A formula expressing a more precise measure would allow a more precise relationship between the scaling factors (duty_Sv and freq_Sv) to be defined which might in turn allow a larger adjustment to be made to the preset duty cycle values. In summary by interleaving duty cycle modulation and frequency modulation, the best aspects of each method are retained, and operating points which might otherwise have been inaccessible can be achieved. High resolution, maximum range, environmental tolerance, and added freedom in hardware design are all achieved.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A wireless power system comprising:
   a transmitting circuit that includes an inductor configured to generate a magnetic field to provide power to a receiver; and
   a drive controller that provides a switching control signal to drive the transmitting circuit, the drive controller configured to adjust frequency and/or duty cycle of the switching control signal to adjust the power generated and provided to the receiver by the transmitting circuit through the inductor to a desired power in response to a control signal from the receiver, the drive controller adjusting the duty cycle to achieve the desired power unless the adjustment of the duty cycle causes the duty cycle to be outside of a predefined duty cycle range and adjusting the frequency to achieve the desired power if the adjustment of the duty cycle causes the duty cycle to be outside of the predefined duty cycle range, wherein the drive controller sets the duty cycle to a duty cycle high preset setting that is less than a predetermined maximum duty cycle if the adjustment of the duty cycle causes the duty cycle to be greater than the predetermined maximum duty cycle and the drive controller calculates and sums the change in frequency to adjust for control error and to adjust for the setting of the duty cycle and adds this sum to the current frequency to determine and set a new frequency for the switching control signal.

2. The system of claim 1, wherein the drive controller sets the duty cycle to a preset duty cycle if the adjustment of the duty cycle causes the duty cycle to be outside of a predefined duty cycle range.

3. The system of claim 1, further comprising:
   a receiver; and
   a load coupled to the receiver, such that the power to the receiver is provided to power the load and/or charge a battery associated with the load.

4. The system of claim 3, wherein a control error is a control error signal that provides an indication between a difference between the desired power and actual power received by the load.

5. The system of claim 3, wherein the load is a mobile battery chargeable device and at least a portion of the switch converter resides within a charging pad.

6. A wireless power system comprising:
   a transmitting circuit that includes an inductor configured to generate a magnetic field to provide power to a receiver; and
   a drive controller that provides a switching control signal to drive the transmitting circuit, the drive controller configured to adjust frequency and/or duty cycle of the switching control signal to adjust the power generated and provided to the receiver by the transmitting circuit through the inductor to a desired power in response to a control signal from the receiver, the drive controller adjusting the duty cycle to achieve the desired power unless the adjustment of the duty cycle causes the duty cycle to be outside of a predefined duty cycle range and adjusting the frequency to achieve the desired power if the adjustment of the duty cycle causes the duty cycle to be outside of the predefined duty cycle range, wherein the drive controller sets the duty cycle to a duty cycle low preset setting that is greater than a predetermined minimum duty cycle if the adjustment of the duty cycle causes the duty cycle to be less than the predetermined minimum duty cycle to allow for adjustment headroom of the duty cycle in subsequent adjustments and the drive controller calculates and sums the change in frequency to adjust for control error and to adjust for the setting of the duty cycle and adds this sum to the current frequency to determine and set a new frequency for the switching control signal.

7. A wireless power system comprising:
   a receiver;
   a load coupled to the receiver, such that the power to the receiver is provided to power the load and/or charge a battery associated with the load; and
   a transmitter comprising:
   a transmitting circuit that includes an inductor configured to generate a magnetic field to provide power to the receiver; and
   a drive controller that provides a switching control signal to drive the transmitting circuit, the drive controller configured to adjust frequency and/or duty cycle of the switching control signal to adjust the power generated and provided to the receiver by the transmitting circuit through the inductor to a desired power in response to a control error signal from the receiver that provides an indication between the desired power and actual power received by the load, the drive controller adjusting the duty cycle to achieve the desired power unless the adjustment of the duty cycle causes the duty cycle to be outside of a predefined duty cycle range and the controller sets the duty cycle to a preset duty cycle and adjusts the frequency to achieve the desired power if the adjustment of the duty cycle causes the duty cycle to be outside of the predefined duty cycle range, wherein the drive controller sets the duty cycle to a duty cycle high preset setting that is less than a predetermined maximum duty cycle if the adjustment of the duty cycle causes the duty cycle to be greater than the predetermined maximum duty cycle and the drive controller calculates and sums the change in frequency to adjust for the control error and to adjust for the setting of the duty cycle and adds this sum to the current frequency to determine and set a new frequency for the switching control signal.

8. The system of claim 7, wherein the load is a mobile battery chargeable device and at least a portion of the transmitter resides within a charging pad.

9. A wireless power system comprising:
a receiver;
a load coupled to the receiver, such that the power to the receiver is provided to power the load and/or charge a battery associated with the load; and
a transmitter comprising:
a transmitting circuit that includes an inductor configured to generate a magnetic field to provide power to the receiver; and
a drive controller that provides a switching control signal to drive the transmitting circuit, the drive controller configured to adjust frequency and/or duty cycle of the switching control signal to adjust the power generated and provided to the receiver by the transmitting circuit through the inductor to a desired power in response to a control error signal from the receiver that provides an indication between the desired power and actual power received by the load, the drive controller adjusting the duty cycle to achieve the desired power unless the adjustment of the duty cycle causes the duty cycle to be outside of a predefined duty cycle range and the controller sets the duty cycle to a preset duty cycle and adjusts the frequency to achieve the desired power if the adjustment of the duty cycle causes the duty cycle to be outside of the predefined duty cycle range wherein the drive controller sets the duty cycle to a duty cycle low preset setting that is greater than a predetermined minimum duty cycle if the adjustment of the duty cycle causes the duty cycle to be less than the predetermined minimum duty cycle and the drive controller calculates and sums the change in frequency to adjust for the control error and to adjust for the setting of the duty cycle and adds this sum to the current frequency to determine and set a new frequency for the switching control signal.

10. A method for providing wireless power, the method comprising:
setting an initial frequency and duty cycle of a switching control signal that drives a transmitting circuit that includes an inductor configured to generate a magnetic field to provide power to a receiver;
receiving a control error signal from the receiver that provides an indication between a desired power and actual power received;
adjusting the duty cycle of the switching control signal to achieve the desired power unless the adjustment of the duty cycle causes the duty cycle to be outside of a predefined duty cycle range;
adjusting the frequency of the switching control signal to achieve the desired power if the adjustment of the duty cycle causes the duty cycle to be outside of the predefined duty cycle range; and
setting the duty cycle to a preset duty cycle if the adjustment of the duty cycle causes the duty cycle to be outside of a predefined duty cycle range; and
calculating and summing the change in frequency to adjust for the control error signal and to adjust for the setting of the duty cycle and adding this sum to the current frequency to determine and set a new frequency for the switching control signal.

11. The method of claim 10, further comprising setting the duty cycle to a duty cycle high preset setting that is less than a predetermined maximum duty cycle if the adjustment of the duty cycle causes the duty cycle to be greater than the predetermined maximum duty cycle.

12. The method of claim 10, further comprising setting the duty cycle to a duty cycle low preset setting that is greater than a predetermined minimum duty cycle if the adjustment of the duty cycle causes the duty cycle to be less than the predetermined minimum duty cycle.

\* \* \* \* \*